United States Patent [19]
Capps et al.

[11] Patent Number: 5,503,462
[45] Date of Patent: Apr. 2, 1996

[54] MECHANICAL TIEDOWN FOR STATIONARY TAILGATE

[75] Inventors: C. Michael Capps, Casper; Timothy Shobak, Barr Nunn, both of Wyo.

[73] Assignee: Western Oil Tool & Mfg. Co., Inc. (Wotco Inc.), Casper, Wyo.

[21] Appl. No.: 219,723

[22] Filed: Mar. 29, 1994

[51] Int. Cl.⁶ .................................................. B60P 1/04
[52] U.S. Cl. .................................... 298/230; 298/23 MD
[58] Field of Search ........................... 298/23 D, 23 DF, 298/23 R, 23 MD

[56] References Cited

U.S. PATENT DOCUMENTS

| | | | |
|---|---|---|---|
| 1,481,763 | 1/1924 | Trimmer | 298/23 D |
| 2,213,385 | 1/1940 | Dailey | 298/23 D |
| 2,439,585 | 4/1948 | Snow | 298/23 DF |
| 4,678,235 | 7/1987 | Hagenbuch | 298/23 DF |

FOREIGN PATENT DOCUMENTS

| | | | |
|---|---|---|---|
| 1091342 | 4/1955 | France | 298/23 DF |
| 9221 | 1/1977 | Japan | 298/23 D |
| 211929 | 12/1983 | Japan | 298/23 D |

Primary Examiner—David A. Bucci
Assistant Examiner—Gregory A. Morse
Attorney, Agent, or Firm—Cushman Darby & Cushman

[57] ABSTRACT

A dump truck is disclosed, including a tailgate connected to a series of linkages to maintain the tailgate in a stationary position when the dump truck bed is in any position between fully lowered and fully raised. Also, a dump truck is disclosed, including a tailgate connected to a series of linkages to rotate the tailgate away from the truck bed to provide a large opening when the contents of the bed are dumped.

8 Claims, 10 Drawing Sheets

MECHANICAL TIEDOWN FOR STATIONARY TAILGATE

FIELD OF THE INVENTION

This invention relates to a tailgate for a dump truck bed that is supported by linkages to maintain the tailgate in a substantially fixed position during the dumping operation or to rotate the tailgate to a predetermined angle relative to the dump truck bed during the dumping operation.

DESCRIPTION OF THE RELATED ART

The traditional dump trucks include swinging tailgates that are mounted to the rear of the dump truck bed to pivot when the weight of the dump truck contents are applied against the tailgate during the dumping action. Disadvantages associated with these swinging tailgates include the interference that the tailgate causes to the contents intended to be dumped ("bridging"), and the lack of synchronism between the opening of the tailgate and the lifting of the bed. These disadvantages have resulted in the design of dump trucks with tailgates that remain stationary (or that move upward) while the bed moves away from the tailgate to provide a larger opening during the dumping action.

Figure 1:
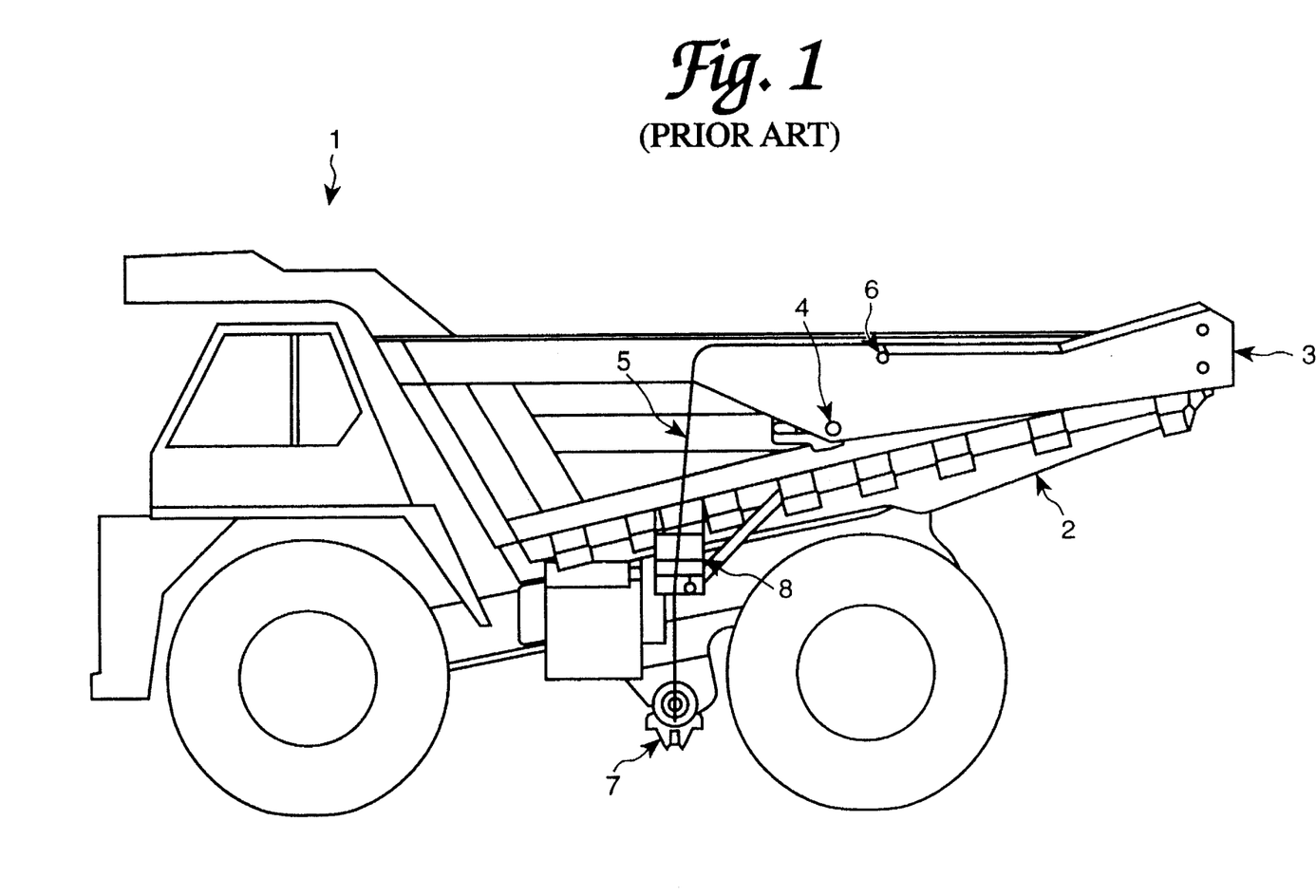
FIGS. 1–2 illustrate known dump trucks with fixed tailgates.
Figure 2:
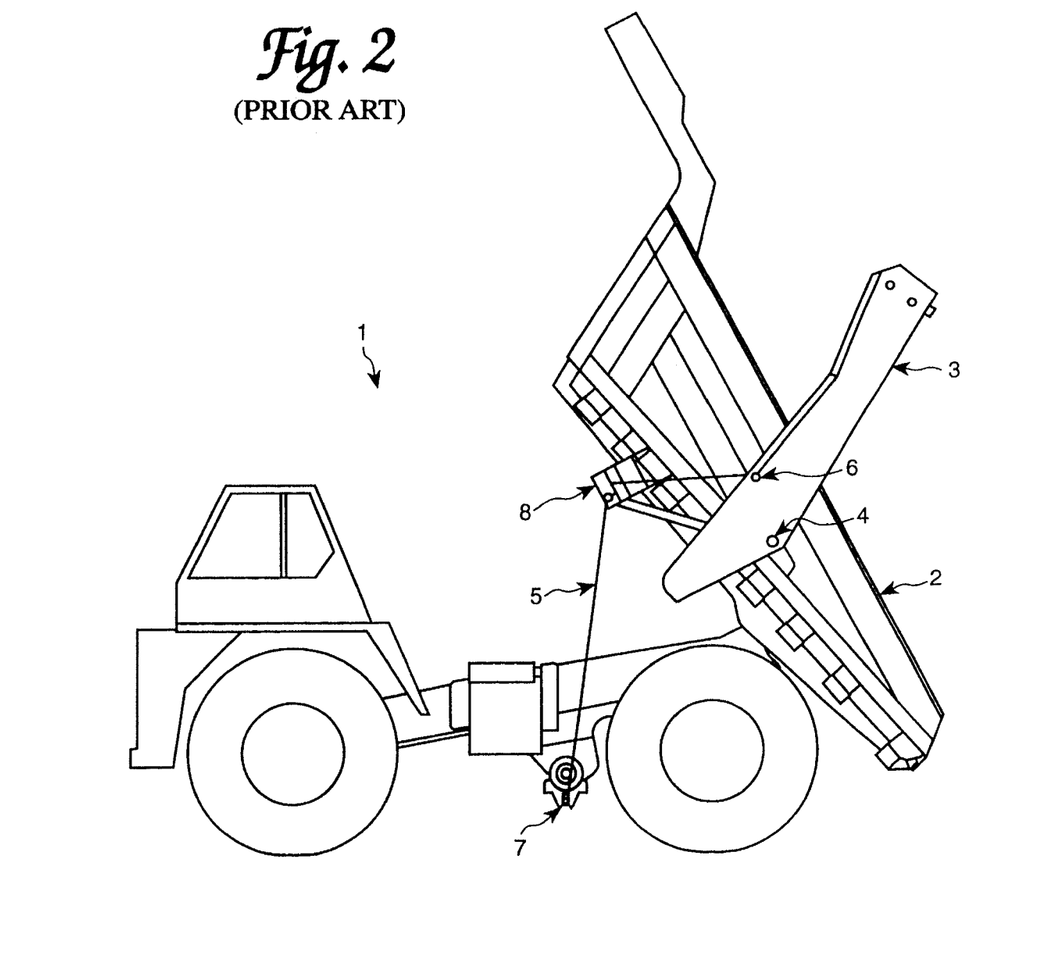

FIGS. 1 and 2 show a fixed tailgate dump truck. FIG. 1 shows the truck 1 in the travelling position and FIG. 2 shows the truck 1 in the dumping position. The truck 1 includes a bed 2 and a tailgate 3. The tailgate is connected to the bed at a pivot 4 such that the tailgate 3 can be in a position covering the rear of the bed 2 in the resting position (FIG. 1) and in a position up and away from the contents of the truck in the dumping position (FIG. 2).

During the dumping action, the tailgate 3 is automatically positioned from the "closed" position of FIG. 1 to the "open" position of FIG. 2 by the operation of a chain 5 and a roller 8. The chain 5 is connected at one end to a point 7 on the truck 1 and at the opposite end to a point 6 on the bed. Between the points 6 and 7, the chain passes through a roller assembly 8 connected to the bed 2. As the dump body tilts, the tailgate 3, being attached to the bed 2 at the pivot 4, is held by the chain 5. This causes the roller 8 to move along the chain 5 closer to the point 6, while the tailgate 3 rotates about the point 4 into a more vertical position. This has the effect of opening the bed 2 and allowing the contents to fall out.

This "chain and roller" type tailgate mechanism provides improved dumping action, but suffers from significant service problems. Due to the high forces on the chain 5 and roller assembly 8 during the dumping action, the bearings (in the roller assembly 8), the roller assembly itself, and the chain 5 wear extremely quickly. In addition, the chains continue to wear at the points where they rest against the roller assembly when the truck travels down the roads.

In addition, previous dump trucks with hydraulic lifters to raise the bed (and allow the tailgate to open by swinging or by operation of the chain and roller) provide poor control and synchronization between the operation of lifting the bed and the operation of opening the gate.

Therefore, a dump truck tailgate assembly is needed that provides the advantages of holding the tailgate substantially stationary while the bed lowers to spill the contents out and that does so without using high-wear components to open the tailgate during the dumping action. Alternatively, a tailgate is needed that rises at a desired angle relative to the lowered bed to provide a particularly sized opening and that does so without using high-wear components to open the tailgate during the dumping action. In addition, a dump truck bed and tailgate assembly is needed that opens the tailgate, while the bed is raising, with better support and under better control than previous methods.

SUMMARY OF THE INVENTION

The present invention provides a dump truck with a tailgate and linkage assembly that either holds the tailgate in a fixed position during dumping or rotates it to a predetermined position, and does so with low-wear, long-life components compared to previously known methods. The linkage assembly also provides better and more controlled support of the tailgate while the bed is raised.

In one embodiment, the present tailgate remains stationary during the dumping action by the operation of a linkage assembly supporting the tailgate relative to both the dump bed and the truck frame. The linkage assembly includes a portion that supports the dump bed while allowing it to rotate around the stationary tailgate. It also includes a portion that applies a force on one end of the tailgate to maintain it in its stationary position about a pivot pin that supports the tailgate on the bed. Finally, the linkage assembly includes a portion that allows the tailgate to move laterally relative to the truck frame as the bed is raising.

Because the present invention eliminates the chain and roller type of mechanism for opening the tailgate, the wear associated with those components is advantageously avoided. In addition, the present linkage assembly provides better support for the tailgate in both the dumping and travelling positions.

In accordance with the above objects and purposes, the invention is described in detail below with particular reference to the accompanying drawings.

DETAILED DESCRIPTION OF THE PRESENTLY PREFERRED EMBODIMENTS

Figure 3:
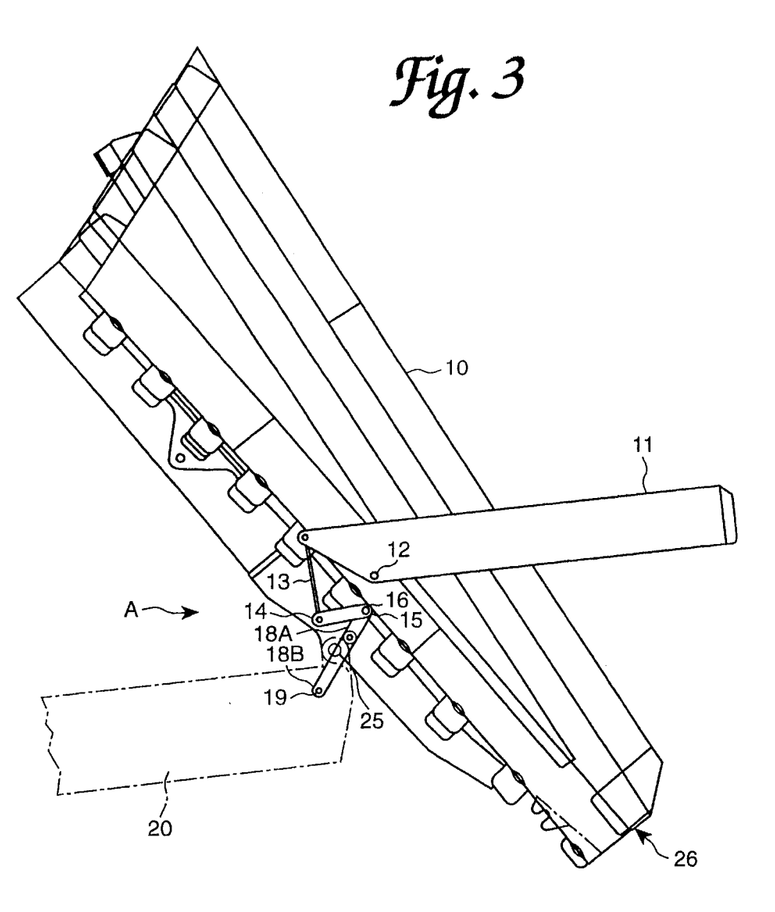
FIG. 3 is a side view of the dump truck bed, truck frame, tailgate, and lifting assembly in the dumping position, according to one embodiment of the present invention.
Figure 4:
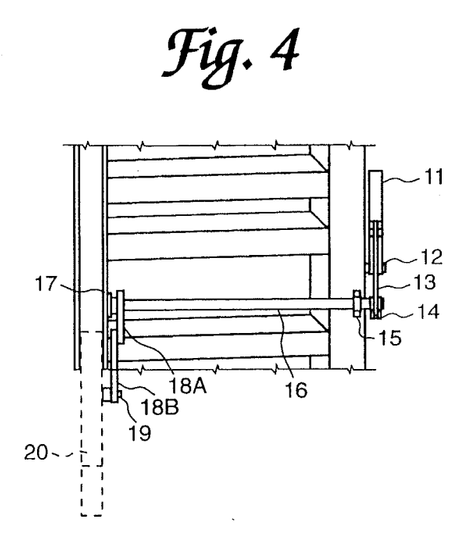
FIG. 4 is a view of the apparatus of FIG. 3 taken at the view "A"
Figure 5:
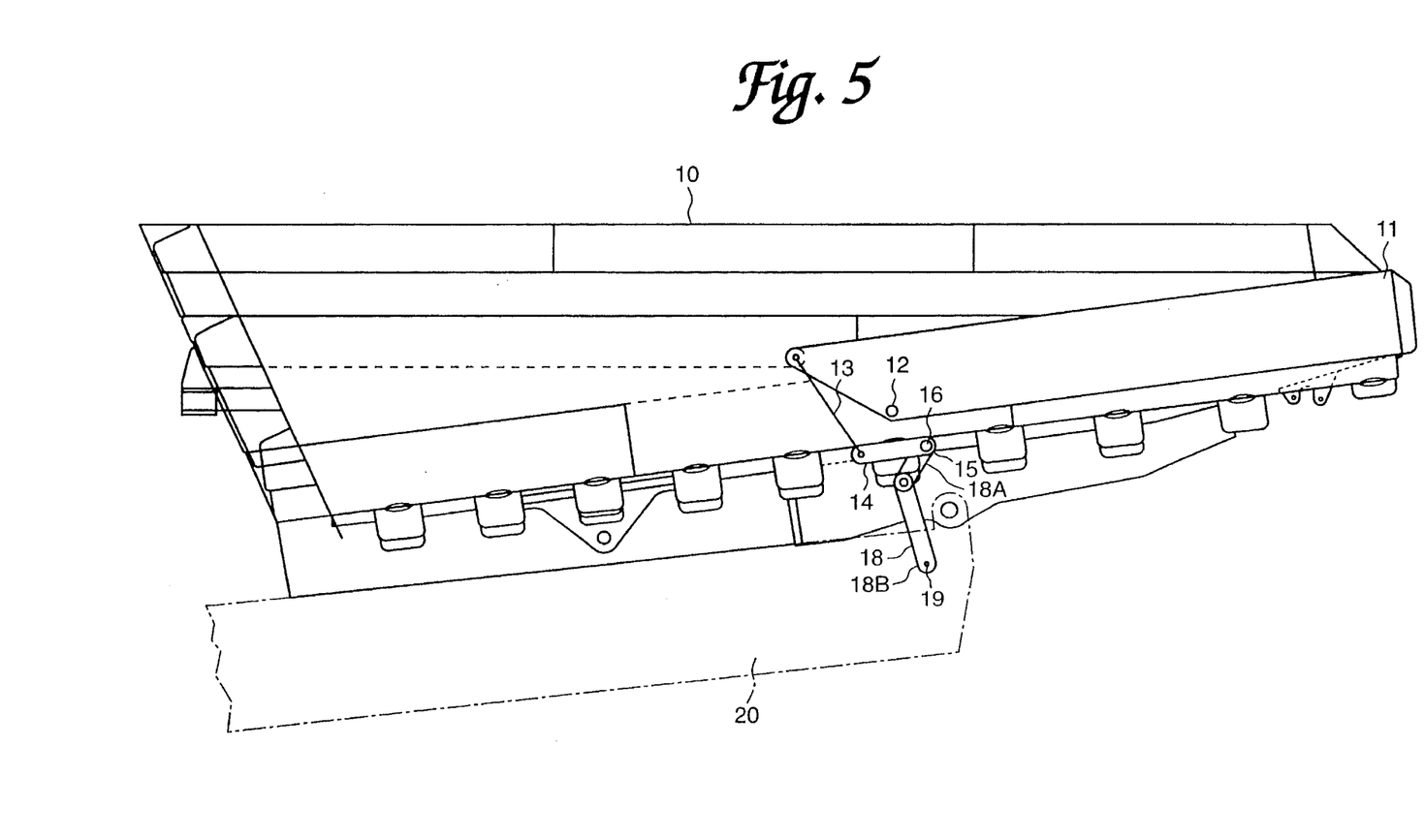
FIG. 5 is a side view of the apparatus of FIG. 3 in the closed position.

FIGS. 3–5 illustrate a dump truck bed 10 mounted on a truck frame 20 at a pivot 25. The bed 10 includes an open end 26 for spilling contents of the bed 10 when the bed is rotated around the pivot 25. The open end 26 can be covered by a tailgate 11, which is attached to the bed 10 by a tailgate pivot 12. The tailgate 11 is also indirectly attached to the truck bed 20 through a series connection of components on each side of the truck.

The series connection of components first includes a pivotal connection between tailgate 11 and one end of a connecting link 13. The opposite end of the connecting link 13 pivotally connects to one end of a lifting arm 14. The opposite end of the lifting arm 14 is welded to a torque bar 16 (FIG. 4), which is rotatably supported relative to the bed 10 through the outer bearings 15 and the inner bearings 17 (FIG. 4).

The opposite end of the torque bar 16 is welded to one end of a first frame linkage 18A near the inner bearings 17. The opposite end of the first frame linkage 18A is pivotally connected to an end of a second frame linkage 18B, which in turn is pivotally connected at its opposite end to the truck frame 20 via the frame pivot 19.

Figure 9:
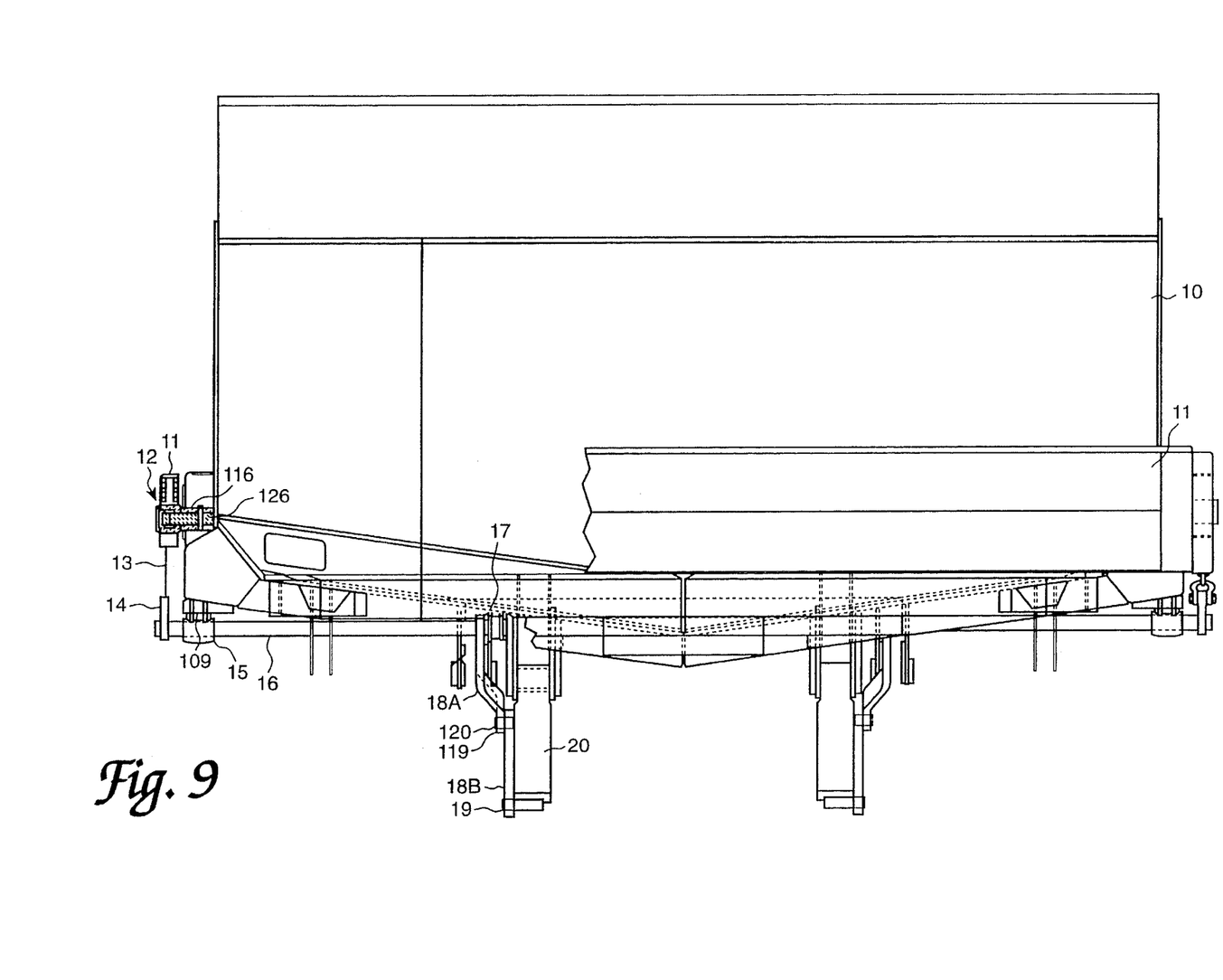
FIG. 9 is a rear view of the dump truck bed, truck frame, tailgate, and lifting assembly in the closed position.

A mirror image arrangement of the connecting link 13, the lifting arm 14, the bearings 15 and 17 (FIG. 9), the torque bar 16, and the link arms 18A and 18B exists on the opposite side (not shown in FIGS. 3–5) of the truck bed 10. FIG. 9, which is discussed in greater detail below, shows the mirror image arrangement.

In operation, the bed 10 and the tailgate 11 sit generally horizontally while the bed is in the travelling position shown in FIG. 5. In the embodiment of FIGS. 3–5, as the bed 10 is raised, the linkage arms 18A and 18B plus the bearings 15 and 17 allow the bed 10 to rotate around the torque bar 16, but generally do not allow the torque bar itself to rotate. Since the lifting arm 14 and the first linkage 18A are welded to the torque bar 16, they too remain stationary relative to the frame 20 while the bed 10 raises.

In the particular embodiment shown in FIGS. 3–5, since the connecting link 13 between the lifting arm 14 and the tailgate 11 is a fixed length, the tailgate 11 remains in a substantially stationary position between the travelling position of FIG. 3 and the dumping position of FIG. 5.

In essence, the lifting arm 14, the first linkage 18A and the torque bar 16 together form a firm lift assembly on top of which the bed 10 rotates. This lift assembly can move slightly left, right, up or down as the bed moves between the positions in FIGS. 3 and 5 and as the second linkage 18B rotates around the frame pivot 19. As can be seen from a comparison of FIGS. 3 and 5, the lift assembly (elements 14, 16, and 18A) is generally held in the same angular displacement regardless of the raised position of the bed, but may move slightly left, right, up or down as it is pushed by the second linkage 18B.

The combination of the first linkage 18A, the lifting arm 14 and the torque bar 16 can be formed as the three welded pieces of FIGS. 3–5, or can be formed of a single piece or any combination of pieces provided they retain the tailgate 11 in a generally stationary position during the rotation of the bed 10 relative to the frame 20.

In an alternative embodiment to FIGS. 3–5, the linkage arms 18A and 18B and the lifting bar 14 can be designed to rotate the tailgate 11 upward (for example, counter-clockwise about point 12 in FIG. 3) when the bed 10 is rotated into the dumping position shown in FIG. 3. This would be desired, for example, when the bed 10 contained large boulders that required a larger opening between the tailgate 11 and the bed 10 to permit the boulders to spill out during dumping. Thus, depending particularly on the size of the contents of the bed 10, the linkages and lift arm can allow the tailgate to hold stationary during the dumping operation, or can allow the tailgate to move to a substantially vertical position during the dumping operation.

In particular, the linkages 18A and 18B and the lift arm 14 can be designed to hold the tailgate 11 at approximately 0 degrees (horizontal in FIG. 3) during the dumping operation, or can allow the tailgate to move to a position at any point within the range of 0 degrees to approximately 80 degrees (generally vertical in FIG. 3) during the dumping operation. One example of how this can be done is to lengthen the second linkage 18B to cause the lift assembly (elements 18A, 14 and 16) to rotate further counter-clockwise (with reference to FIG. 3), thus pulling the connecting link 13 further downward, and rotating the tailgate 11 counter-clockwise about the tailgate pivot 12.

The invention is not limited to any particular dimensions or configurations of the torque bar 16, the connecting link 13, the lifting arm 14 and the linkages 18A and 18B, but such criteria can be chosen by known stress analyses to accommodate the forces expected for the particular dump truck model to which the invention is applied. Preferably (though not necessarily), the torque bars 16 should be placed as near to the pivots 12 as the tire clearance on the truck will allow.

Figure 6:
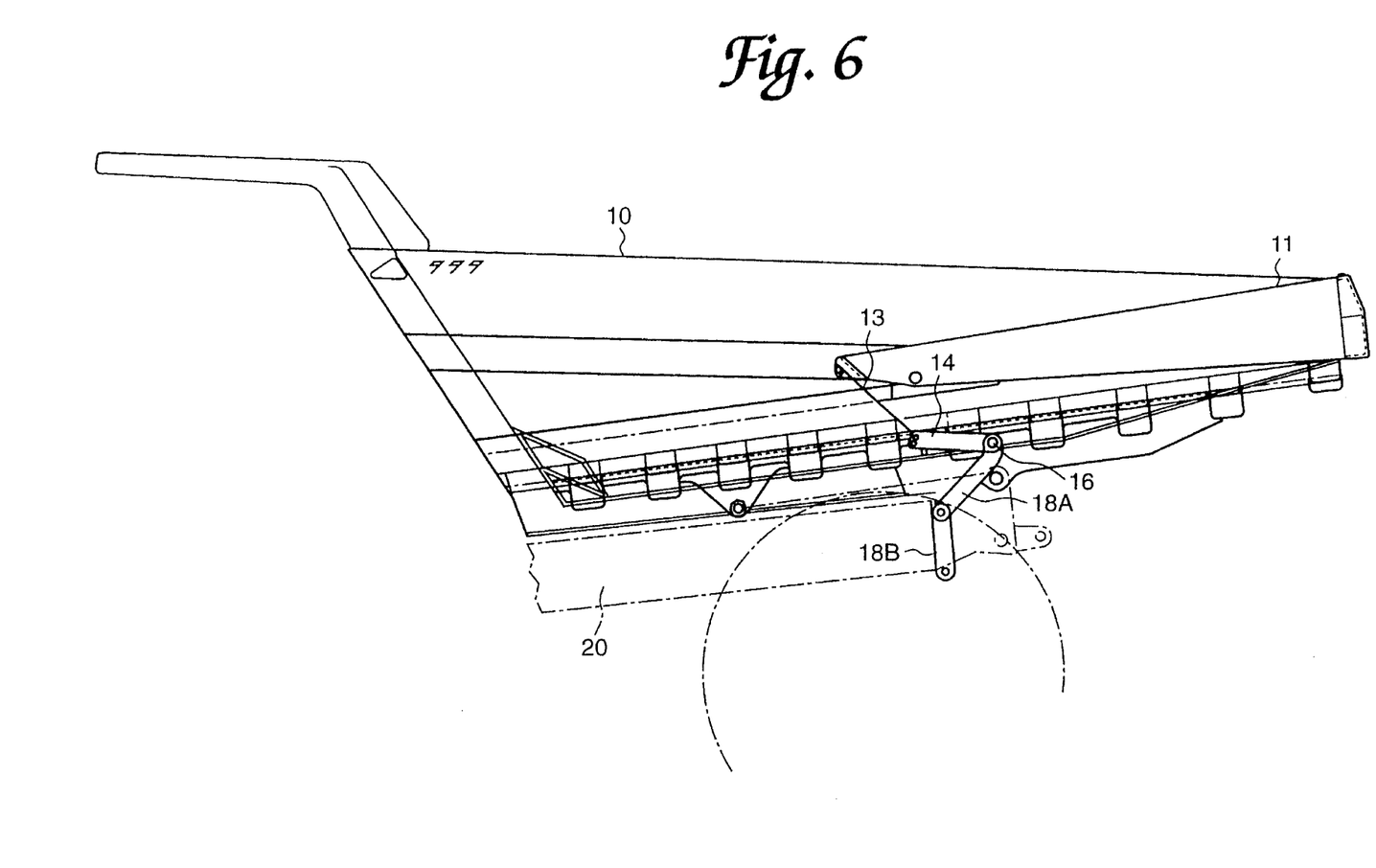
FIG. 6 is a side view of the dump truck bed, truck frame, tailgate, and lifting assembly in the closed position, according to another embodiment of the present invention.
Figure 7:
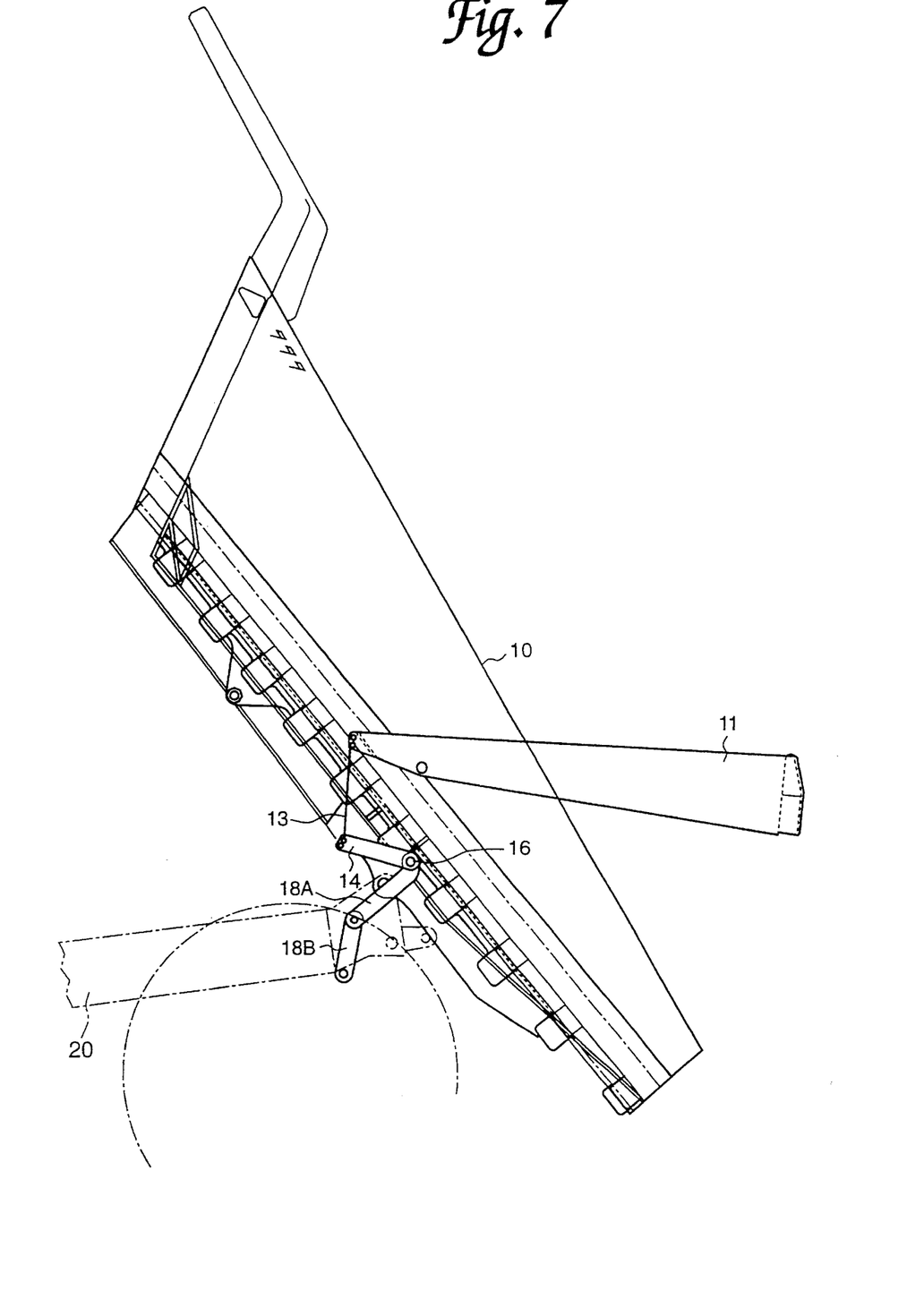
FIG. 7 is a side view of the apparatus of FIG. 6 in the dumping position.
Figure 8:
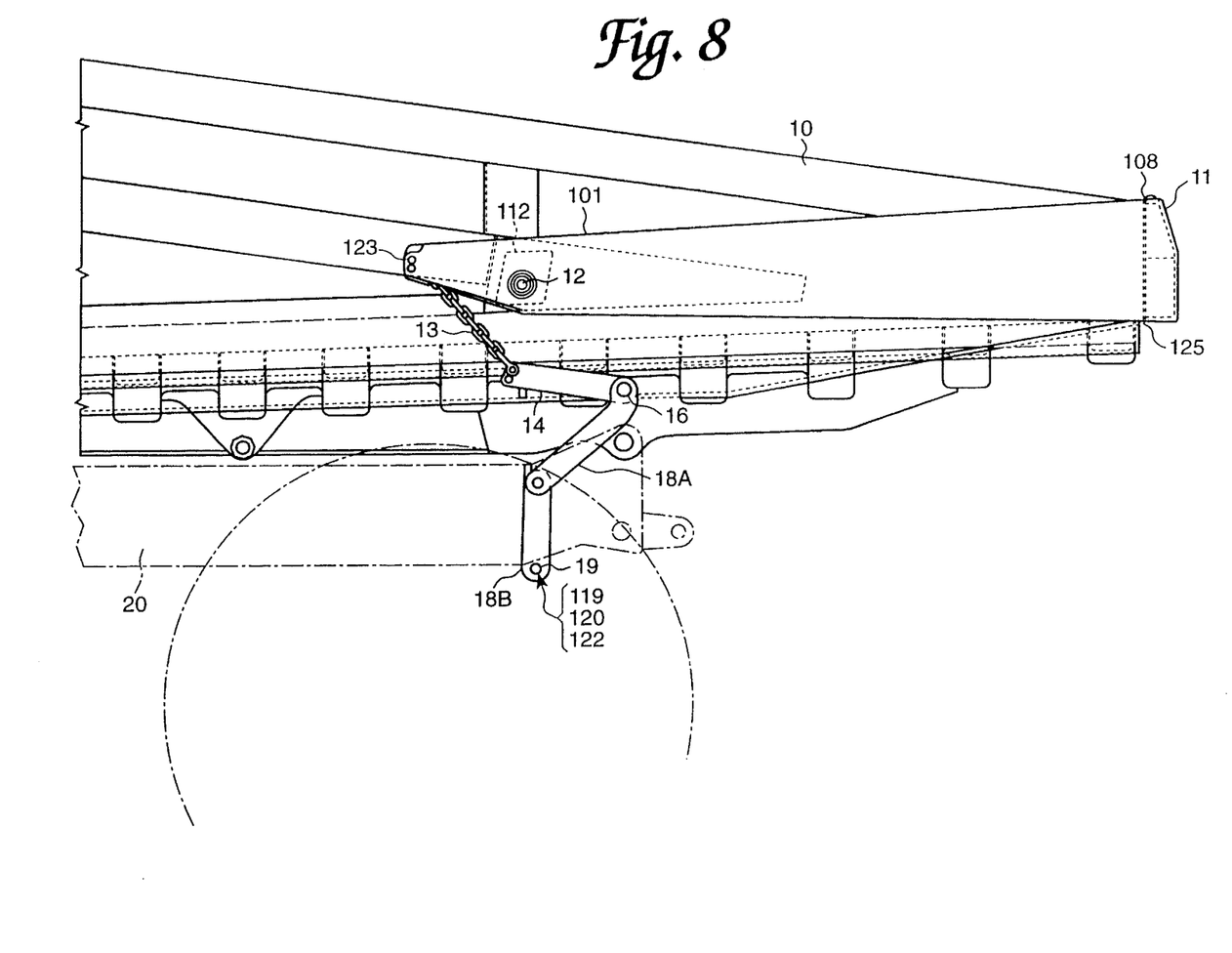
FIG. 8 is an enlarged view of the link arm assemblies of FIG. 6.

FIGS. 6–8 illustrate another embodiment of the present invention where the first linkage 18A is curved near the point where it is welded to the torque bar 16. FIG. 6 shows the bed 10 in the travel position and FIG. 7 shows the bed 10 in the dumping position. In the apparatus of FIGS. 6–8, like in the apparatus of FIGS. 3–5, the bed 10 is raised relative to the frame 20 while the tailgate 11 is held generally stationary by the stationary position of the lift assembly (elements 14, 16 and 18A) and the fixed length connecting link 13. The operation of the apparatus of FIGS. 6–8 is generally identical to that described with respect to FIGS. 3–5. FIGS. 6–8 demonstrate that many different forms of linkages may be used to satisfy the objectives of the present invention.

FIG. 8 shows the general linkage assembly of FIG. 6. Second linkage arm 18B is shown connected to the frame 20 at the frame pivot 19. At the frame pivot 19, a common pivot assembly, including a bushing ring 119, a retaining ring 120 and a pivot pin 122 are included to permit the second linkage arm 18B to rotate relative to the frame 20. The second linkage arm 18B is then pivotally connected to the first linkage arm 18A. The lift assembly (14, 16, and 18A) described above is also shown in greater detail in FIG. 8.

Also shown in FIG. 8 is the connecting link 13 which takes the form of a chain in the embodiment of FIG. 8. The connecting link 13 is attached to the tailgate 11 by a lift pin 123 such that the connecting link 13 can pivot around the lift pin 123 as the bed 10 raises relative to the frame 20.

Where the tailgate 11 attaches to the bed 10, a pivot support plate 112 of increased strength and/or thickness can be added to support the arm 101 of the tailgate 11 on the pivot 12.

The rear of the tailgate may include a rail section 108 at the top to minimize rock and shovel damage to the tailgate during loading. To support the tailgate in the travelling (down) position, a floor extension 125 is welded to the rear of the existing bed 10 (see also FIG. 9).

FIG. 9 shows an embodiment of the present invention generally corresponding to the embodiment previously described with respect to FIGS. 3–5. FIG. 9 is a view looking at the rear of the truck. The torque bar 16 is near the base of the bed 10 and sits generally horizontally. Looking at the torque bar 16 on the left side of FIG. 9, the left end of that torque bar 16 is welded to the lifting arm 14 and the right end of that torque bar 16 is welded to the first linkage arm 18A. As the bed 10 lifts from the frame 20, the second linkage 18B rotates (into the page of FIG. 9) around frame pivot 19. The first and second linkages 18A and 18B are connected with known pivoting equipment, including a bushing 119 and a retaining ring 120.

The bed 10 is supported by and rotates about the pivot bore 127. This causes the body to rotate relative to the torque bar 16 at the bearings 15 and 17.

The pivot connection 12 between the tailgate 11 and the bed 10 is also shown in greater detail in FIG. 9. Tailgate 11 is supported and rotates around the pivot pin 126 attached to the bed 10 within the pivot support tube 116.

Figure 10:
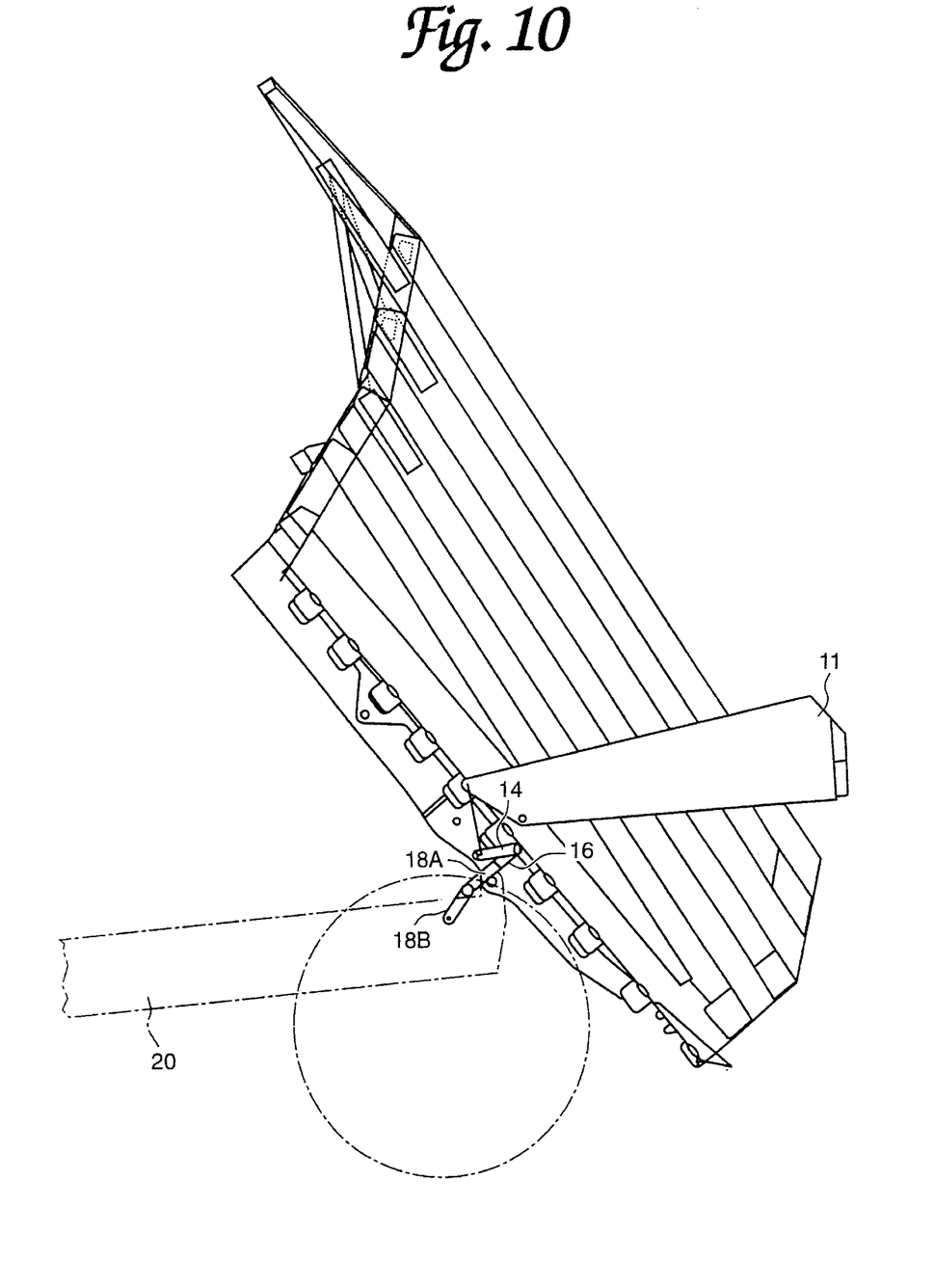
FIG. 10 is a side view of the dump truck bed, truck frame, tailgate, and lifting assembly in the dumping position, according to another embodiment of the present invention.
Figure 11:
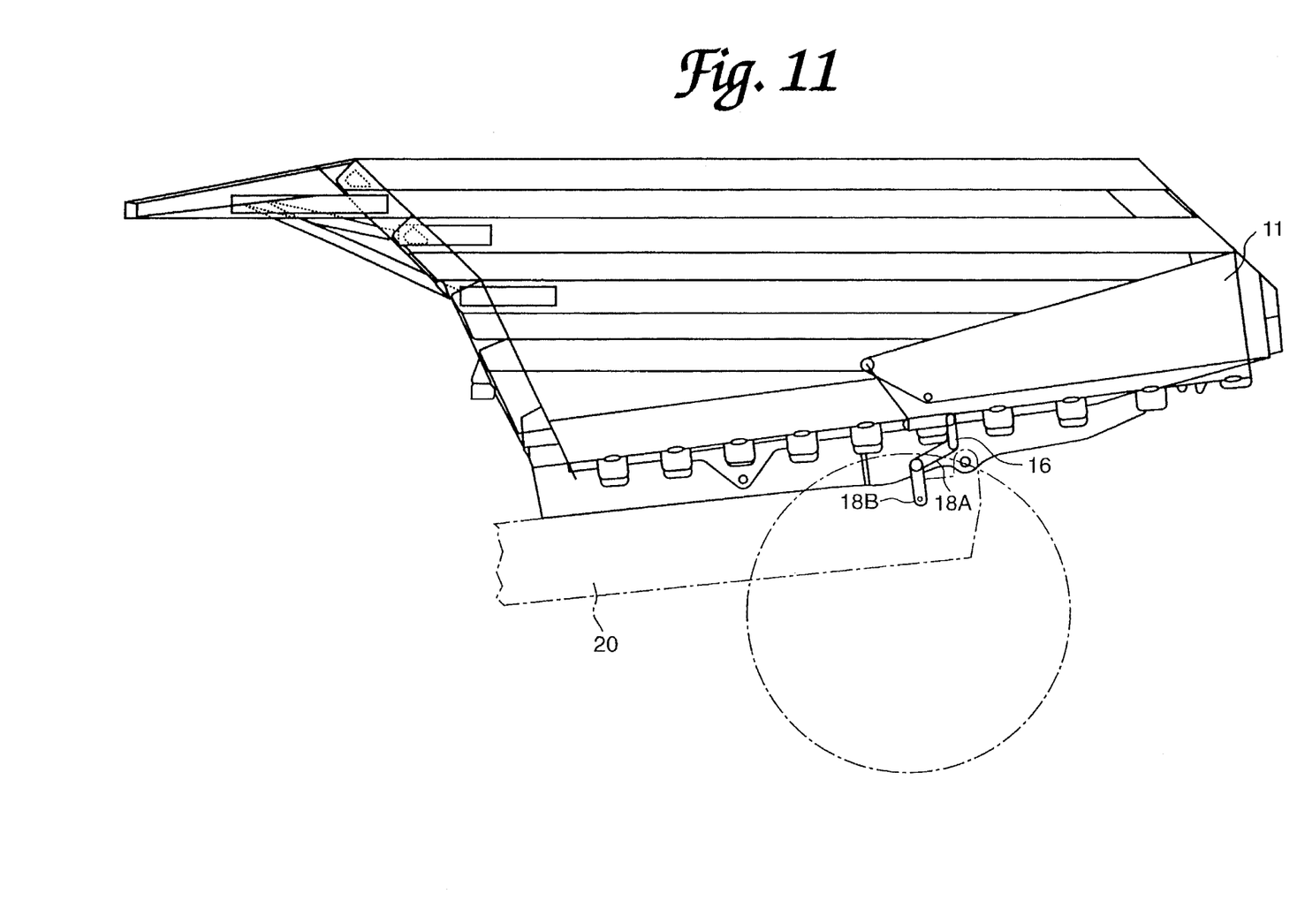
FIG. 11 is a side view of the apparatus of FIG. 6 in the closed position.

FIGS. 10 and 11 show yet another embodiment of the present invention which differs from the embodiment of FIGS. 3–5 in that the torque bar 16 is not positioned horizontally (as is shown in FIG. 9), but is angled downwardly from the point of contact with the lifting arm 14 until the point of contact with the first linkage 18A.

Based on the above disclosure, various changes and modifications will be obvious to those of ordinary skill in the art. The claims are intended to cover all such changes and modifications that fall within the spirit and scope of the invention.

What is claimed is:

1. An enclosure for storing and dumping contents, comprising:

a frame;

a bed pivotally coupled to the frame and having an open end, a tailgate pivotally coupled to the bed for selectively closing said open end; and a tailgate linkage assembly for indirectly coupling the tailgate to the bed and to the frame, said tail gate linkage assembly comprising, on each side of the bed:

a connecting link of a fixed length pivotally coupled to the tailgate;

a lift assembly pivotally attached to the connecting link, said lift assembly including a torque bar rotatably supported relative to the bed through inner and outer bearings whereby the bed is rotatable relative to the lift assembly; and a frame linkage pivotally attached at one end to the lift assembly and pivotally attached at an opposite end to the frame, whereby when the bed is in a first position relative to the frame, the connecting link, lift assembly, and frame linkage hold the gate in a first location substantially enclosing the open end, and whereby when the bed is in a second position relative to the frame, the connecting link, lift assembly and frame linkage hold the gate in substantially the first location.

2. An enclosure for storing and dumping contents, comprising:

a frame;

a bed pivotally coupled to the frame and having an open end, a tailgate pivotally coupled to the bed for selectively closing said open end; and a tailgate linkage assembly for indirectly coupling the tailgate to the bed and to the frame, said tailgate linkage assembly comprising, on each side of the bed:

a connecting link of a fixed length pivotally coupled to the tailgate;

a lift assembly pivotally attached to the connecting link, said lift assembly including a torque bar rotatably supported relative to the bed through inner and outer bearings, whereby the bed is rotatable relative to the lift assembly; and a frame linkage pivotally attached at one end to the lift assembly and pivotally attached at an opposite end to the frame, whereby when the bed is in a first position relative to the frame, the connecting link, lift assembly, and frame linkage hold the gate in a first location substantially enclosing the open end, and whereby when the bed is rotated to a second position relative to the frame, the connecting link, lift assembly and frame linkage rotate the gate away from the open end to a second location.

3. An enclosure as in claim 1, wherein said tailgate is generally U-shaped, including first and second arms extending generally parallel to, and a gate portion extending generally transverse to a longitudinal axis of said bed.

4. An enclosure as in claim 1, wherein each said connecting link is pivotally coupled to a respective arm of said tailgate.

5. An enclosure as in claim 1, wherein each said connecting link is flexible.

6. An enclosure as in claim 1, wherein each said lift assembly comprises a lift arm component having first and second longitudinal ends, said first longitudinal end being pivotally coupled to said connecting link and said second longitudinal end being welded to a first end of said torque arm, said lift assembly further comprising a first linkage component, welded at a first end thereof to a second end of said torque arm and pivotally coupled at a second end thereof to said frame linkage.

7. An enclosure as in claim 3, wherein said arms of said tailgate are fixed to said gate portion so as to be immovable relative thereto.

8. An enclosure as in claim 5, wherein each said connecting link comprises a length of link chain.

\* \* \* \* \*